United States Patent [19]
Yoo

[11] Patent Number: 5,833,157
[45] Date of Patent: Nov. 10, 1998

[54] TAPE TENSION ADJUSTING DEVICE FOR USE IN A VIDEO CASSETTE RECORDER

[75] Inventor: Hyo-Jong Yoo, Seoul, Rep. of Korea

[73] Assignee: Daewoo Electronics Co., Ltd., Seoul, Rep. of Korea

[21] Appl. No.: 937,383

[22] Filed: Sep. 25, 1997

[30] Foreign Application Priority Data

Sep. 30, 1996 [KR]  Rep. of Korea ...................... 96-43322

[51] Int. Cl.⁶ .................................................. G11B 15/43
[52] U.S. Cl. ......................................................... 242/334.6
[58] Field of Search .......................... 242/334.6; 360/71, 360/74.3, 85, 95

[56] References Cited

U.S. PATENT DOCUMENTS

| | | | |
|---|---|---|---|
| 4,139,169 | 2/1979 | Kono . | |
| 5,167,380 | 12/1992 | Choi | 360/96.3 |
| 5,445,337 | 8/1995 | Kwon | 242/334.6 |
| 5,625,509 | 4/1997 | Matsuoka | 360/94 |

FOREIGN PATENT DOCUMENTS

| | | | |
|---|---|---|---|
| 58-118052 | 7/1983 | Japan | 242/334.6 |
| 2308720 | 7/1997 | United Kingdom . | |
| 2312781 | 11/1997 | United Kingdom . | |

*Primary Examiner*—John P. Darling
*Attorney, Agent, or Firm*—Anderson, Kill & Olick, P.C.

[57] ABSTRACT

A tape tension adjusting device for use in a video cassette recorder includes a tension lever rotatably mounted on a deck to be biased toward the tape by a spring and having a tension pole coming into contact with the tape, a band holder mounted on the tension lever and having a first fixing portion which is of a cylindrical shape and a second fixing portion which is substantially a semicircle, the first fixing portion having a smaller diameter than that of the second fixing portion, and a band brake retained around the supply reel, for exerting a braking force on the supply reel. One end of the band brake is fixed to the first fixing portion of the band holder and the other thereof is fixed to the second fixing portion of the band holder, thereby controlling a rotating speed of the supply reel and adjusting tape tension.

5 Claims, 3 Drawing Sheets

TAPE TENSION ADJUSTING DEVICE FOR USE IN A VIDEO CASSETTE RECORDER

FIELD OF THE INVENTION

The present invention relates to a tape tension adjusting device for use in a video cassette recorder; and, more particularly, to a tape tension adjusting device having one band holding member and capable of adjusting the threshold angular position of a tension lever.

BACKGROUND OF THE INVENTION

Generally, in a video cassette recorder, the tension of a tape running between the take-up reel and the supply reel must be constantly controlled or adjusted to a desired level depending on an operating mode of the video cassette recorder. For this reason, various types of tape tension adjusting devices have been proposed and used to adjust the tension of the running magnetic tape.

One of the prior art tape tension adjusting devices is illustrated in FIG. 1. In the illustrated device, after a magnetic tape T is arranged onto a predetermined travel path between a supply reel 9 and a take-up reel (not shown), a tension lever 1 pivotally mounted on a deck through a hinge 3 is permitted to be biased toward the magnetic tape T by a spring 4. In response to the movement of the tension lever 1, a tension pole 2 mounted on a distal end of the tension lever 1 rotates toward the running magnetic tape T, as represented with an arrow, to press the magnetic tape T, thereby forcing a band brake 5, whose one end is connected to the tension lever 1 through a moving band holder 6, into an operative position. At the operative position, the band brake 5 exerts a braking force on the supply reel 9 in response to a further rotation of the tension lever 1. The band brake 5 is supported by a fixed band holder 7 at the other end thereof which is mounted on the deck. The fixed band holder 7 is provided with a band length adjustment 8 for setting the length of the band brake 5.

In the illustrated tape tension adjusting device described above, however, the band brake is designed to be supported by two different elements, thereby rendering the device to be complicated.

SUMMARY OF THE INVENTION

It is, therefore, a primary object of the invention to provide a tape tension adjusting device having one band holding member and capable of adjusting a threshold angular position of a tension lever.

In accordance with one aspect of the present invention, there is provided a tape tension adjusting device for use in a video cassette recorder provided with a deck and a supply reel comprising: a tension lever rotatably mounted on the deck to be biased toward a tape by a spring and having a tension pole coming into contact with the tape; a band holder mounted on the tension lever and having a first fixing portion which is of a cylindrical shape and a second fixing portion which is substantially a semicircle, wherein the first fixing portion has a smaller diameter than that of the second fixing portion; and a band brake retained around the supply reel, for exerting a braking force on the supply reel, wherein one end of the band brake is fixed to the first fixing portion of the band holder and the other thereof is fixed to the second fixing portion of the band holder.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
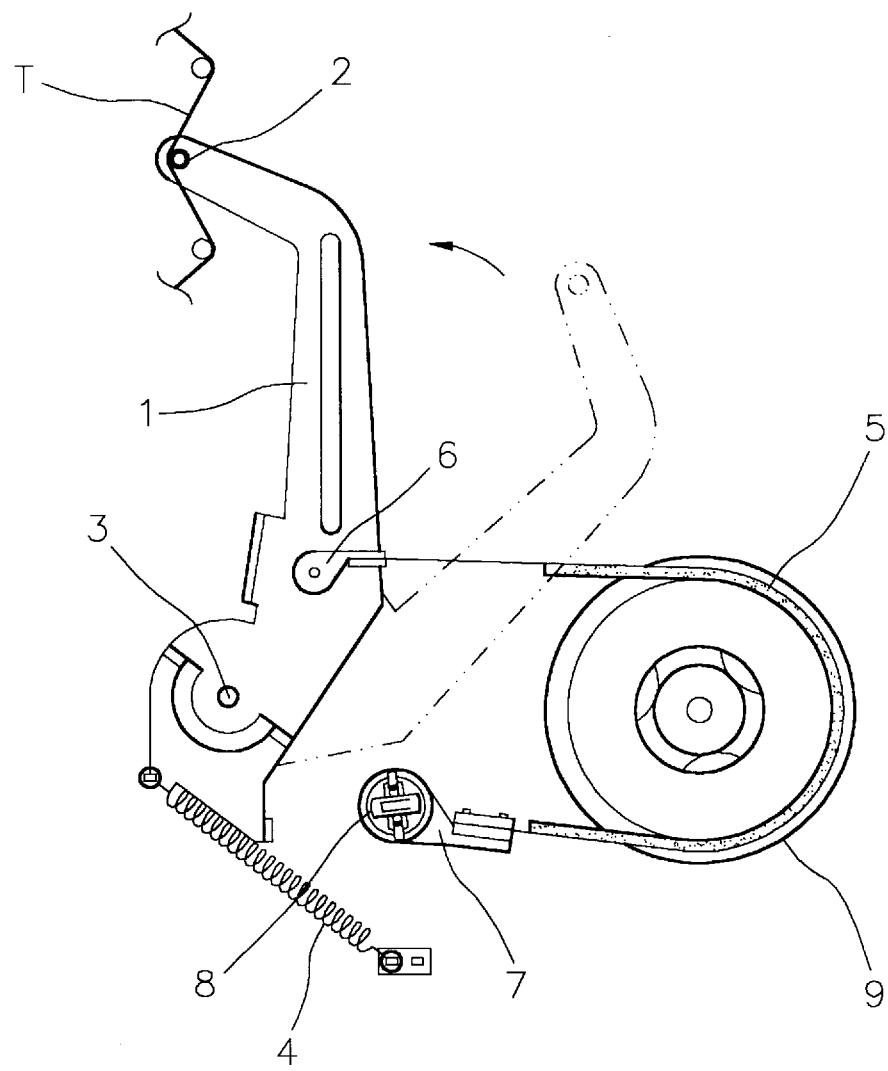
FIG. 1 shows a top plan view of a prior art tape tension adjusting device.
Figure 2:
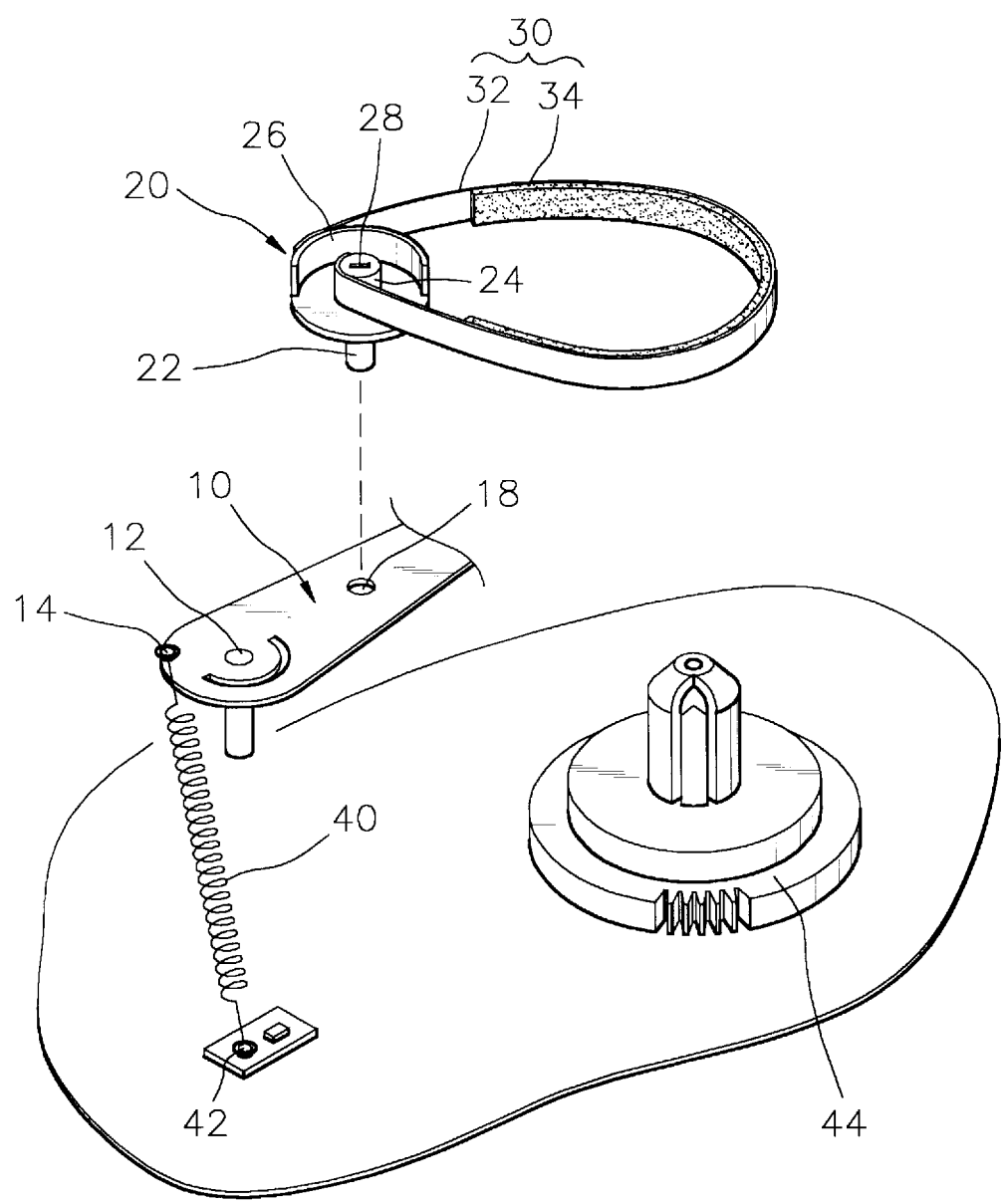
FIG. 2 illustrates an exploded view of a tape tension adjusting device in accordance with the present invention.
Figure 3:
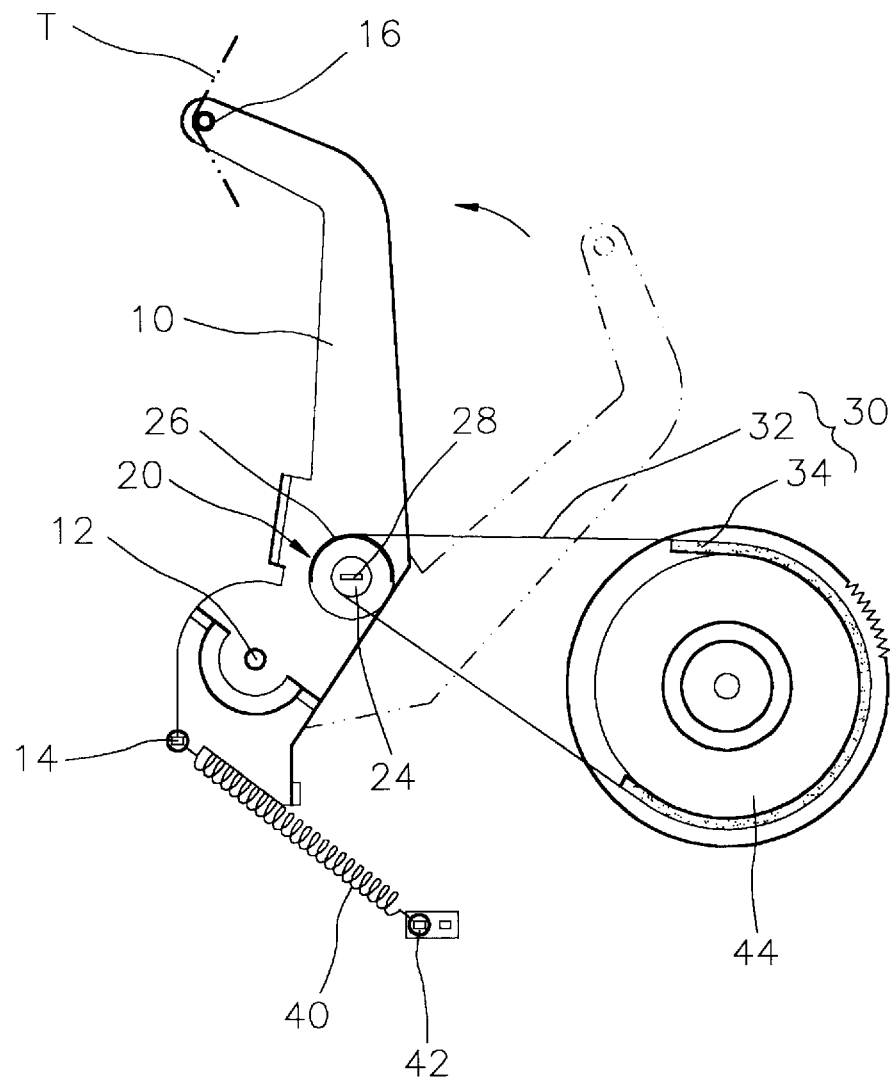
FIG. 3 represents a top plan view of the tape tension adjusting device in accordance with the present invention.

Referring to FIGS. 2 and 3, the inventive tape tension adjusting device for use in a video cassette recorder includes a tension lever 10, a band holder 20 and a band brake 30.

The tension lever 10 is pivotably mounted on a deck (not shown) through a hinge 12. The tension lever 10 has a spring hook seat 14 at its proximal end through which a coil spring 40 is retained to the tension lever 10 at its one end. The other end of the coil spring 40 is retained to a protuberance 42 on the deck to allow the coil spring 40 to urge the tension lever 10 to rotate counterclockwise on the deck. Vertically installed on a distal end of the tension lever 10 is a tension pole 16 which serves to press a running magnetic tape T.

The band holder 20 is mounted on the tension lever 10 by closely fitting its shaft 22 into a hole 18 of the tension lever 10. The band holder 20 has a first fixing portion 24 which is of a cylindrical shape and a second fixing portion 26 which is of an open circle, e.g., a semicircle having a predetermined width, wherein the first fixing portion 24 has a smaller diameter than that of the second fixing portion 26. The difference in diameter of the fixing portions 24, 26 allows an effective distance of the band brake 30 to be adjusted, wherein the effective distance of the band brake 30 is the actual distance of the band brake 30 having an effect on the tape tension. Further, the band holder 20 has a groove 28 for facilitating the turning of the band holder 20 at its top.

The band brake 30 for exerting a braking force on the supply reel 44 includes a film 32 and a felt portion 34 attached on an inner part of the film 32. The felt portion 34 serves as a friction surface with the supply reel 44 when the band brake 30 applies a braking force on the supply reel 44. The band brake 30 retained around the supply reel 44 is, at its one end, fixed to the first fixing portion 24 of the band holder 20 and is, at its the other end, fixed to the second fixing portion 26 thereof.

An operation of the inventive tape tension adjusting device designed in this manner is described with reference to FIG. 3.

Initially, since, e.g., a mode change moving plate (not shown) located beneath the deck hinders the counterclockwise rotation of the tension lever 10, the tension lever 10 is forced to be positioned at a retreated position, as represented by a phantom line, till the magnetic tape T is completely loaded onto its travel path from a tape cassette (not shown) inserted into the video cassette recorder. When the tape loading operation is completed and the magnetic tape T starts to run, the mode change moving plate permits the tension lever 10 to be rotated by the coil spring 40 and the tension pole 16 comes into a contact with the running magnetic tape T. At the same time, the band brake 30 is arranged on its applying position around the supply reel 44. In this set-up, when the tape tension decreases and the tension lever 10 rotates counterclockwise, the band brake 30 in response to a rotation of the tension lever 10 applies the braking force on the supply reel 44 to thereby cause a rotating speed of the supply reel 44 to decrease. When the tape tension is increased and the tension lever 10 rotates clockwise, the band brake 30 releases the supply reel 44, which restores the supply reel 44 to the normal rotating speed. That is, the band brake 30 starts to apply the braking force on the supply reel 44 whenever the tension pole 16 is further rotated counterclockwise from its threshold angular position, whereas no braking force is exerted by the band brake 30, when the tension pole 16 stays in an angular position rotated clockwise from the threshold angular position.

Further, the inventive band holder 20 can adjust the threshold angular position of the tension lever 10. That is, if the band holder 20 is rotated with respect to the tension lever 10 by applying, e.g., a screwdriver on the groove 28 of the band holder 20, the effective distance of the band brake 30 is changed due to the difference in diameter of the fixing portions 24, 26 of the band holder 20. As a result, the threshold angular position of the tension lever 10 is adjusted.

Although the invention has been shown and described with respect to the preferred embodiments, it will be understood by those skilled in the art that various changes and modifications may be made without departing from the scope of the invention as defined in the following claims.

What is claimed is:

1. A tape tension adjusting device for use in a video cassette recorder provided with a deck and a supply reel, the device comprising:

a tension lever rotatably mounted on the deck to be biased toward a tape by a resilient means and having a tension pole coming into contact with the tape;

a band holder mounted on the tension lever and having a first fixing portion which is of a cylindrical shape and a second fixing portion which is of an open circle, wherein the first fixing portion has a smaller diameter than that of the second fixing portion; and a band brake retained around the supply reel, for exerting a braking force on the supply reel, wherein one end of the band brake is fixed to the first fixing portion of the band holder and the other thereof is fixed to the second fixing portion of the band holder.

2. The tape tension adjusting device of claim 1, wherein the resilient means is a coil spring.

3. The tape tension adjusting device of claim 1, wherein the first fixing portion of the band holder has a groove for facilitating the band holder to turn.

4. The tape tension adjusting device of claim 1, wherein the band brake includes a film and a felt portion attached to the film for improving a frictional force with respect to the supply reel.

5. The tape tension adjusting device of claim 1, wherein the second fixing portion of the band holder is substantially a semicircle.

* * * * *